United States Patent [19]
Schonberg et al.

[11] Patent Number: 5,741,093
[45] Date of Patent: Apr. 21, 1998

[54] APPARATUS FOR COLLECTING LIGHTWEIGHT OBJECTS

[76] Inventors: David J. Schonberg, 6595 Cord 4W SW.; Neal E. Fosdick, 1338 Hiebel Rd. SW., both of Alexandria, Minn. 56308

[21] Appl. No.: 632,288
[22] Filed: Apr. 15, 1996
[51] Int. Cl.⁶ ..................................... B65G 53/14
[52] U.S. Cl. .................. 406/153; 406/171; 406/194
[58] Field of Search ........................ 406/151, 152, 406/153, 171, 194

[56] References Cited

U.S. PATENT DOCUMENTS

| | | | |
|---|---|---|---|
| 1,278,175 | 9/1918 | Baron | 406/153 X |
| 2,744,286 | 5/1956 | Carpenter et al. | 406/152 X |
| 4,043,718 | 8/1977 | Takenaka et al. | 406/151 X |
| 4,829,724 | 5/1989 | Miller, Jr. et al. | 406/151 X |
| 5,088,860 | 2/1992 | Stockdale et al. | 406/171 X |
| 5,096,337 | 3/1992 | Denton | 406/171 X |
| 5,195,852 | 3/1993 | Malugani et al. | 406/153 |
| 5,323,819 | 6/1994 | Shade | 406/152 X |

*Primary Examiner*—Andrew C. Pike
*Attorney, Agent, or Firm*—Herman H. Bains

[57] ABSTRACT

Air packaging peanut recovery system for recovering packing peanuts includes an operator held wand connected to a flexible conduit. The flexible conduit has a discharge end extending into a collection hopper having a mesh top. The wand is provided with an air valve having an actuating handle and a discharge jet. The air valve is connected to a connected source of air under pressure. The orifice of the discharge jet faces downstream and produces a vacuum at the inlet end of the wand when air under pressure flows through the discharge jet orifice. A turbulator pin is mounted on the wand and is adjustable to project into the path of the air stream discharged from the orifice of the discharge jet. By manipulation of the handle or adjustment of the turbulator pin, the vacuum may be readily adjusted.

6 Claims, 2 Drawing Sheets

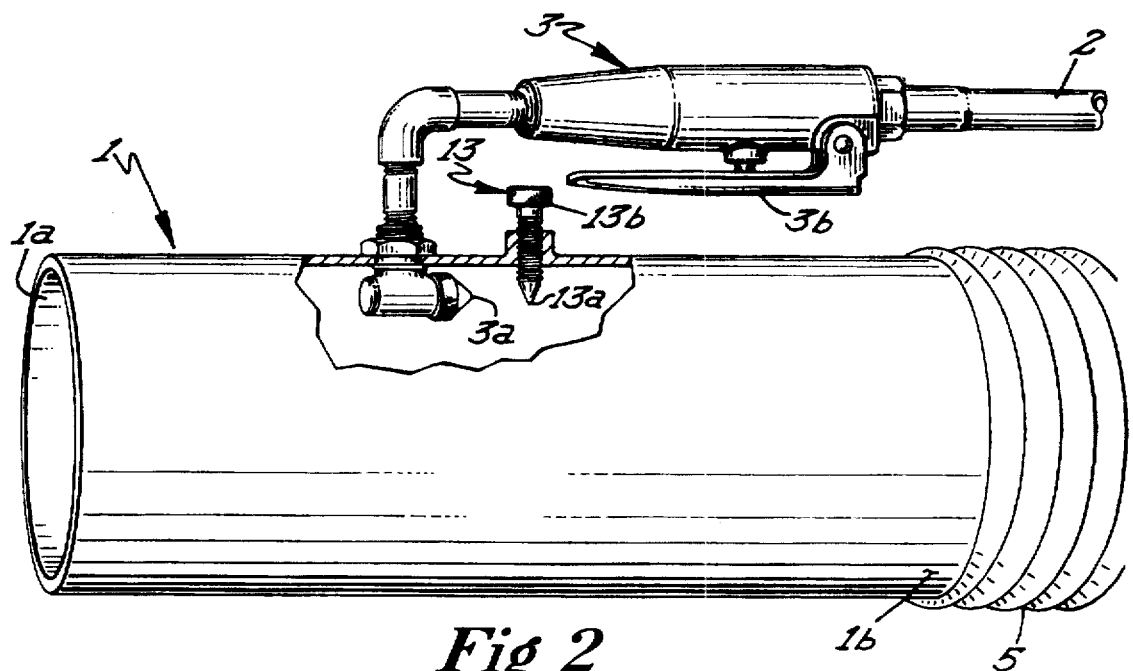
Fig 2
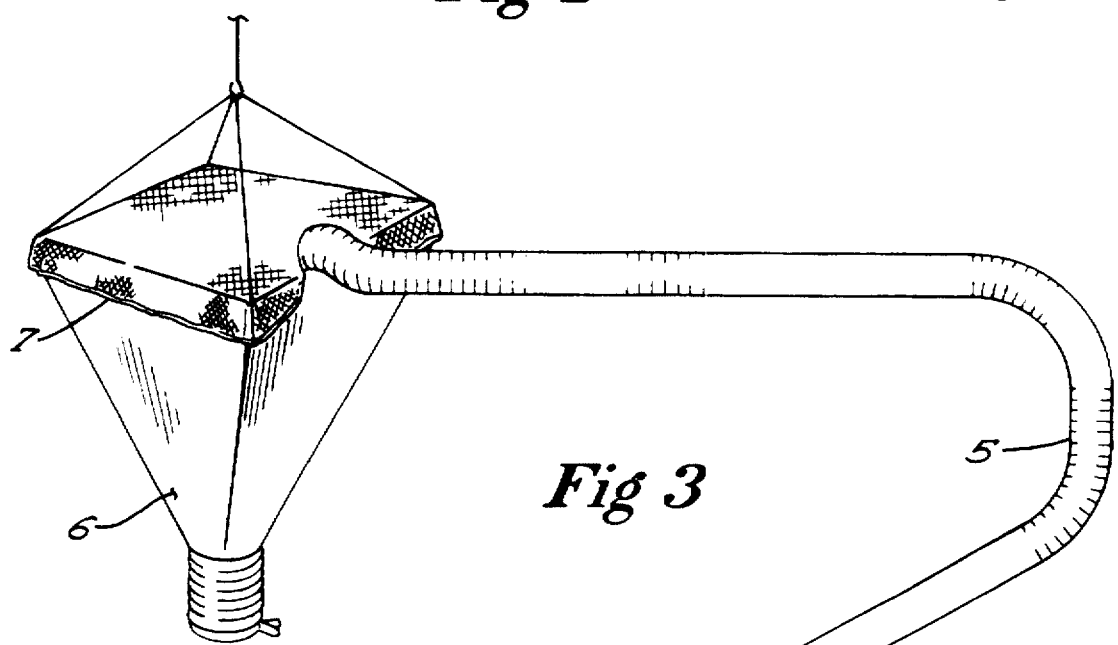
Fig 3
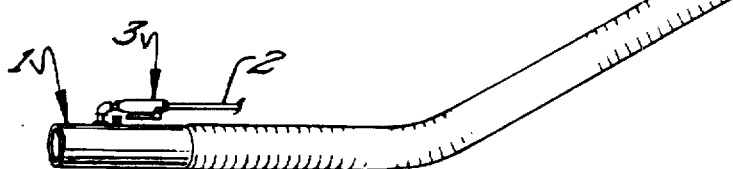

APPARATUS FOR COLLECTING LIGHTWEIGHT OBJECTS

FIELD OF THE INVENTION

This invention relates to an apparatus for collecting lightweight objects and more particularly to a vacuum type apparatus for collecting foam packaging peanuts.

BACKGROUND OF THE INVENTION

The advent of foam packaging peanuts was a boon to the shipping industry, but a pain on the receiving end. Peanuts are so light they float in the air, they stick to clothing and parts, they're difficult to corral and sweep up once they fall on the floor, and some kinds are not suitable for landfills. Packaging peanuts created a need for a device that would facilitate recovery, clean up, and recycling. Several prior art patents were developed for this purpose. U.S. Pat. No. 5,000,623 to Kihlström is directed to a machine that sucks up "piece-formed packing material". This machine is provided with its own motor and its own container. The Kihlström apparatus does not use compressed air.

U.S. Pat. No. 5,096,337 to Denton also discloses a vacuum type collection apparatus which is provided with its own motor and collection bag. Again, it is noted that this Denton patent does not use compressed air.

U.S. Pat. No. 5,088,860 to Stockdale et al. discloses a collection apparatus "for selectively gathering lightweight low density objects". This apparatus utilizes its own low pressure regenerative type blower "having an output pressure capacity of from 25" to 48" . . . H$_2$O" to create "a low pressure vacuum . . . in the range of 0.4" to 0.65" in H$_2$O". This apparatus is not designed to create a strong vacuum nor is it designed to operate with existing compressed air systems.

In spite of these prior art developments, several needs continue to exist. There is a need for some kind of add-on unit that could utilize existing air compressors and existing peanut dispensers. There is also a need for an apparatus that produces a strong vacuum capable of transferring peanuts to distant hoppers or elevated hoppers. There is also a need for an apparatus which fills peanut dispensers without lowering the dispensers by means of a rope and pulley, manually dumping in giant bags of packaging peanuts, and then pulling the dispensers up again. Finally, if recovery and recycling of packaging peanuts is really going to work for small shops, there is a need for something more affordable than any of the prior art devices discussed hereinabove. The present invention meets those needs.

OBJECTS OF THE INVENTION

An object of this invention is the provision of the vacuum type apparatus for collecting lightweight objects which utilizes existing compressed air for producing a vacuum thereby obviating the need for additional fans, blowers, or air compressors.

Another object of this invention is the provision of an apparatus for collecting lightweight objects which makes use of existing hoppers. Whereas prior art systems use hoppers or containers which are especially designed for use in such systems thereby adding to the expense of these prior art systems, this invention is easily adapted for use with existing containers.

A further object of this invention is the provision of a vacuum type apparatus for collecting lightweight objects which effectively removes packaging peanuts from giant bags of these peanuts usually supplied by peanut manufactures thereby eliminating the need to empty these bags manually. Further, because of its strong vacuum, our apparatus is capable of transferring peanuts substantial distances including high overhead locations. Although our apparatus may operate at a strong vacuum, the apparatus may be readily adjusted to reduce the vacuum to a low magnitude for sucking up peanuts from around small lightweight objects.

Another object of this invention is to provide a novel apparatus for collecting lightweight objects, which is not only of simple and inexpensive construction, but one which takes up little space, and is affordable and easily adaptable for small shops.

BRIEF DESCRIPTION OF THE FIGURES OF THE DRAWING

FIG. 2 is an enlarged fragmentary perspective view of a portion of the apparatus including the wand, the air valve, and the turbulator pin.

FIG. 3 is a perspective view showing that the wand and the dispensing hopper can be separated from each other by an extended length of flexible hose in order to transfer packaging peanuts over a considerable distance.

DESCRIPTION OF THE PREFERRED EMBODIMENT

Figure 1:
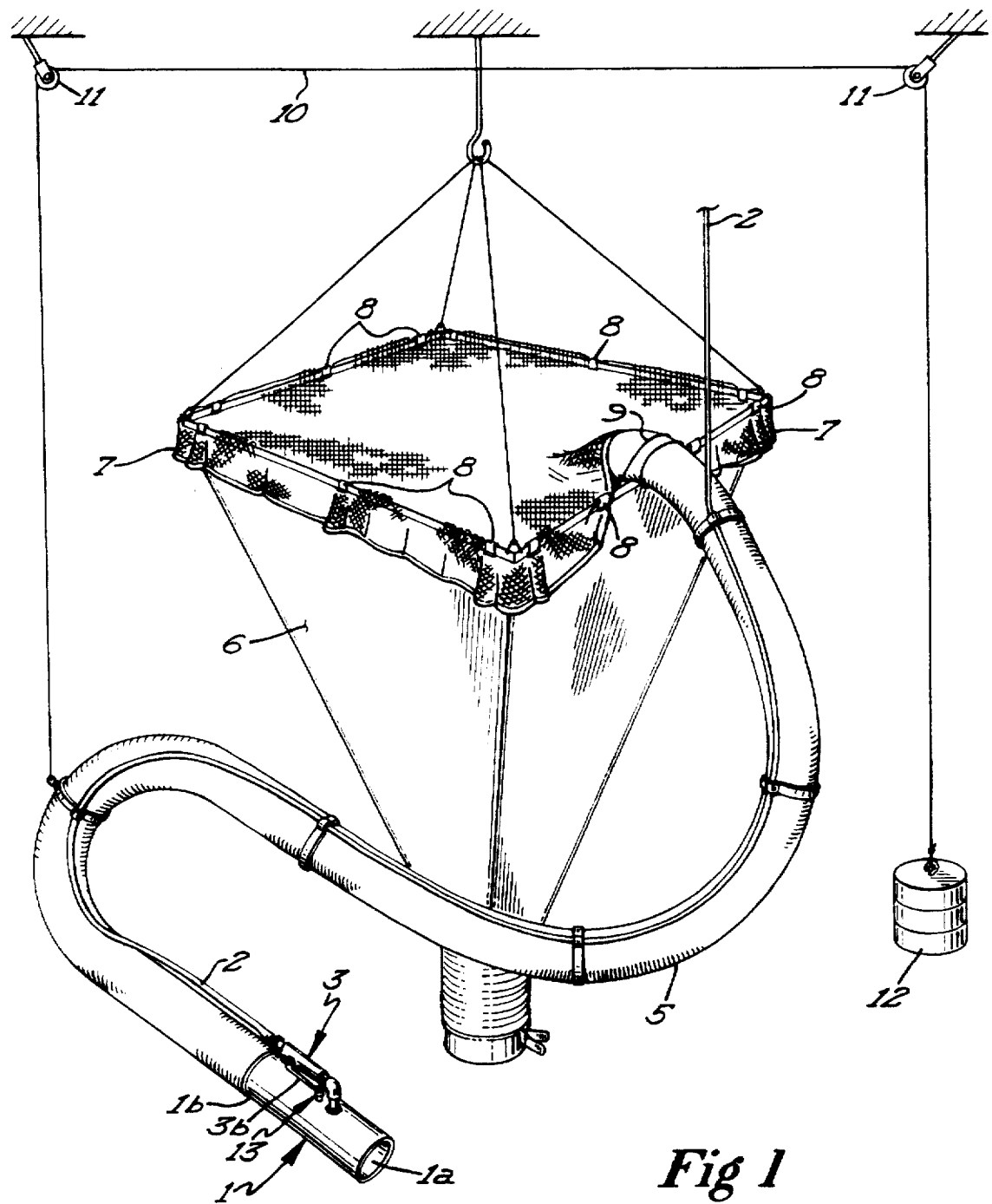
FIG. 1 is a perspective view of my novel apparatus illustrating the various components thereof.

Referring now to the drawings and more particular to FIGS. 1 and 2, it will be seen that one embodiment of my apparatus is thereshown. The apparatus includes an elongate wand which comprises an elongate rigid tube through which the packaging peanuts flow. Air is supplied to the interior of the wand 1 through an air line 2 via an inline air valve 3 as best seen in FIG. 1. The air line 2 is connected to a source of compressed air (not shown) such as the compressed air (approximately 50-140 psi) which comprises conventional routine equipment in many shops. The air valve 3 projects into the interior of the wand 1 and is provided with a rearwardly or downstream facing discharge jet 3a as shown in FIG. 2. The inline air valve 3 is also provided with an actuating handle 3b which is pivoted to the body of the air valve and is operated by the user. The air valve is normally closed and when actuated intercommunicates the air line with the jet orifice 3a to permit air under pressure to be ejected from the jet. The handle is variously adjustable to permit the amount of air discharged through the air jet 3a to be adjusted over a wide range. When the air valve is completely opened, a strong jet of air is discharged from the jet into the downstream end of the wand 1. The downstream movement of the compressed air pulls air through the inlet end 1a of the wand and thereby induces a vacuum in the wand. Packaging peanuts are caught up in this vacuum and are drawn towards the downstream end of the wand. The vacuum produced in the wand is within the range of '0"' to '3½"' H$_2$O for sucking the peanuts into and through the wand.

The downstream end 1b of the wand is connected to one end of an elongate flexible hose 5 as shown in FIG. 1. The other end of the flexible hose extends into a receiving hopper 6 which, in the embodiment shown, is a conventional styrofoam packaging peanut dispenser. It is pointed out however that the hopper 6 could be a bag, box, or barrel which would perform the collecting function.

Referring again to FIG. 1, it will be seen that the hopper 6 is provided with a mesh lid or cover 7 which is secured to the upper edges of the hopper by squeeze clips 8. Conventional peanut dispensers have an open top which may result in the packaging peanuts escaping therefrom by being entrained in the air which carries the peanuts to the dispenser. The mesh cover 7 permits the air delivered to the hopper to escape therethrough and also prevents the peanuts from escaping the hopper. Use of the squeeze clips allows the user to quickly and easily apply the mesh lid 7 to conventional peanut dispensers or hoppers.

The downstream end of the flexible hose is secured to the hopper 6 by cable ties 9. One end of an elongate rope 10 is secured to the flexible hose adjacent the wand 1 and the rope is trained over the pulleys 11 and has its other end secured to a counterweight 12. The rope 10, pulleys 11, and counterweight 12 provide a recoil system so that the wand 1 is out of the way when not in use. It is pointed out that the wand may be pulled down to the level of a work table or even to the floor for convenient vacuuming of peanuts. The counterweight 12 serves to cause the wand to recoil to its elevated inactive position when the apparatus is not being used. It is further pointed out that a spring or other commercial recoil device can replace the counterweight system featured in the preferred embodiment.

As pointed out above, the vacuum and the apparatus can be adjusted by manipulation of the vacuum handle 3b of the inline valve 3. The vacuum may also be controlled by adjustment of a turbulator pin 13 which is threaded through an opening in the wand 1 and projects downwardly into the wand. In this regard, it will be noted that the turbulator pin has a tapered lower end 13a which projects into the wand and enlarged adjustment head 13b located exteriorly of the wand. When the turbulator pin is vertically adjusted, the turbulator pin may be moved into obstructing relation with respect to the jet of air emitted from jet 3a of the valve 3, or the turbulator pin may be moved in the opposite direction to completely remove the pin from interfering with the jet of air.

When the turbulator pin 13 is advanced so that it interferes with the jet of air coming out of the orifice of the jet 3a, turbulence is created which reduces a vacuum at the upstream or inlet end 1a of the wand 1. As the turbulator pin 13 enters the jet of air discharged from the jet orifice 3a, more turbulence is created. If a sufficient turbulence is created, all vacuum is lost. Thus the turbulator pin 13 permits the operator to adjust the vacuum at the upstream end of the wand 1 from zero to the full strong vacuum depending upon the needs of the operator in collecting the packaging peanuts. If the operator needs speed in order to quickly empty a giant bag of peanuts into a dispensing hopper, then the operator retracts the turbulator pin 13 for full vacuum. On the other hand, if the operator is cautiously removing peanuts from around lightweight parts, then the operator advances the turbulator 13 to reduce the vacuum until it is of the desired magnitude needed for the removal.

FIG. 3 illustrates that the wand and the receiving container or hopper 6 can be separated large distances from each other and still effectively collect packaging peanuts. Using compressed air, a much greater vacuum is produced than the vacuum produced by the prior art references discussed herein above. This particular feature gives the present apparatus a measure of versatility allowing packaging peanuts to be transferred to greater distances and with greater elevations than that of the prior art devices.

From the foregoing description, it will be seen that our novel collection apparatus is not only extensive and versatile but operators actually enjoy using the apparatus in the recovery and recycling of packaging peanuts.

Further, not only does our apparatus use existing air compressor systems, and existing peanut dispensers, it can quickly transfer packaging peanuts to elevated hoppers or remote locations. When set for full vacuum, the apparatus sucks up peanuts so quickly that it eliminates the need to manually dump packaging peanuts into a peanut dispenser. On the other hand, by merely adjusting the turbulator pin 13 or the valve handle 3b, the apparatus can generate a vacuum of varying magnitudes as needed by the specific job.

Thus our apparatus is ideal for small shops because of its inexpensive construction and its ability to use existing compressed air systems and dispensers.

What is claimed is:

1. A packaging peanut recovery system for recovering foam packing peanuts, the recovery system comprising:

an elongate, hand-held, tubular wand having an upstream inlet opening at an inlet end thereof and a downstream outlet opening at an outlet end thereof, an elongate flexible hose having one end thereof connected to the outlet end of the wand, a receiving container for receiving the packaging peanuts therein, another end of said flexible hose extending into said container, a mesh lid closing the container and permitting air under pressure to escape therethrough, and an air valve mounted on said wand and connected in communicating relation to a conventional source of the air under pressure, said valve having a discharge orifice positioned within said wand for discharging the air under pressure in a downstream direction to produce a strong vacuum in the wand within a range of 0" to 3½" $H_2O$ for sucking the packing peanuts into the wand and through the flexible hose for delivery to the container, said valve including an actuating handle for opening and closing the air under pressure to said orifice, and for controlling an amount of the air under pressure discharged through said discharge orifice for varying the vacuum.

2. The packaging peanut recovery system as defined in claim 1 further comprising a recoil support device including a flexible member connected to said wand and to a recoil member for normally urging said wand upwardly to an out-of-way support position when the wand is not being used.

3. The recovery system as defined in claim 2 wherein said air valve further includes a rearwardly facing jet positioned within said wand and having an outlet defining said orifice.

4. A packaging peanut recovery system for recovering foam packing peanuts, the recovery system comprising:

an elongate, hand-held, tubular wand having an upstream inlet opening at an inlet end thereof and a downstream outlet opening at an outlet end thereof, an elongate flexible hose having one end thereof connected to the outlet end of the wand, a receiving container for receiving the packing peanuts therein, another end of said flexible hose extending into said container, a mesh lid closing the container and permitting air under pressure to escape therethrough, an air valve mounted on said wand and connected in communicating relation to a conventional source of the air under pressure, said valve having a discharge orifice positioned within said wand for discharging the air under pressure in a downstream direction to produce a vacuum in the wand, said valve including an actuating handle for opening and closing the air under pressure to said orifice, and adjustment means on said wand for adjusting the vacuum in the wand, said actuating handle and said adjustment means being independently and selectively adjustable to variously adjust the vacuum in the wand.

5. The packaging peanut recovery system as defined in claim 4 wherein said adjustment means adjusts the vacuum within the wand by variously adjusting air turbulence within the wand.

6. The packaging peanut recovery system as defined claim 5 wherein said adjustment means includes an adjustment member shaped and configured to variously adjust the turbulence when shifted within said wand.

* * * * *